United States Patent [19]

Gallaro et al.

[11] 3,891,440

[45] June 24, 1975

[54] PROCESS FOR FABRICATING A COLOR CATHODE RAY TUBE SCREEN STRUCTURE INCORPORATING OPTICAL FILTER MEANS THEREIN

[75] Inventors: Anthony V. Gallaro, Auburn; Robert A. Hedler, Seneca Falls, both of N.Y.

[73] Assignee: GTE Sylvania Incorporated, Stamford, Conn.

[22] Filed: Nov. 2, 1973

[21] Appl. No.: 412,145

[52] U.S. Cl. .......................... 96/36.1; 96/1; 96/1.2; 96/36.2; 96/38.3; 427/54; 117/33.5 CM; 313/473; 313/472; 313/474

[51] Int. Cl. ............................................ G03g 13/22

[58] Field of Search ..... 117/33 C, 33 CM, 34; 96/1, 96/1.2, 36.1, 36.2, 38.3; 313/472, 473, 474

[56] References Cited

UNITED STATES PATENTS

| | | | |
|---|---|---|---|
| 3,362,804 | 1/1968 | Hamilton | 117/33.5 CM |
| 3,569,761 | 3/1971 | Lange | 96/36.1 |
| 3,681,111 | 8/1972 | Kaplan | 96/36.1 |
| 3,695,871 | 10/1972 | Lange | 96/36.1 |
| 3,726,678 | 4/1973 | Robinder | 96/36.1 |
| 3,734,724 | 5/1973 | Kachel | 117/33.5 CM |
| 3,748,515 | 7/1973 | Kaplan | 117/33.5 CM |
| 3,812,394 | 5/1974 | Kaplan | 313/474 |

*Primary Examiner*—William R. Trenor
*Attorney, Agent, or Firm*—Norman J. O'Malley; Cyril A. Krenzer; Frederick H. Rinn

[57] ABSTRACT

A color cathode ray tube screen structure, having means for enhancing the absorption of ambient light and providing improvement in the contrast of the image display, is comprised of a basic multi-windowed webbing of substantially opaque material having optical filter elements disposed in the window areas thereof. A process is provided for fabricating patterns of these diversely-hued filters whereof a coating of heat formable optical filter material is applied and transformed by heat. Light exposure through an apertured pattern mask polymerizes like areas of two superposed layers of diverse negative photo-resist materials separately applied thereover to provide protective means for defining the filter element areas and expediting discrete removal of the extraneous filter materials. The process provides for the deposition of one or more patterns of filter elements, such being related to the respective window patterns of the web-like structure and compatibly associated with specific color-emitting phosphor components of the patterned screen.

8 Claims, 14 Drawing Figures

PROCESS FOR FABRICATING A COLOR CATHODE RAY TUBE SCREEN STRUCTURE INCORPORATING OPTICAL FILTER MEANS THEREIN

CROSS REFERENCES TO RELATED APPLICATIONS

This application contains matter disclosed but not claimed in three related U.S. Pat. applications filed concurrently herewith and assigned to the assignee of the present invention. These related applications are Ser. No. 412,143, Ser. No. 412,142 and Ser. No. 412,144.

BACKGROUND OF THE INVENTION

This invention relates to color cathode ray tubes and more particularly to a process for fabricating a color cathode ray tube screen structure providing improved purity and contrast of the color image display.

Cathode ray tubes, particularly those of the type employed in color television applications for presenting multi-colored display imagery, conventionally utilize patterned multi-element screen structures comprised of repetitive groupings of related color-emitting phosphor materials. In conventional tube construction, such groupings are normally disposed relative to the interior surface of the tube viewing panel as bars, stripes, or dots depending upon the type of color cathode ray tube structure under consideration. For example, in the well known shadow mask color tube construction, the screen pattern is conventionally composed of a great multitude of repetitive tri-color emissive areas formed of selected cathodoluminescent phosphors, which, upon predetermined electron beam excitation, produce additive primary hues to provide the desired color imagery. Spatially related to the screen is a foraminous structure or pattern mask member having a vast number of discretely formed apertures therein of configurations such as round, elliptical and elongated shapings. Each of these apertures in the pattern member is related to a specific tri-component grouping of related color-emitting phosphor areas of the screen pattern, in a spaced manner therefrom to enable the selected electron beams traversing the apertures to impinge the proper areas of the phosphor screen therebeneath. Normally the individual phosphor elements of the screen pattern are separated from one another by relatively small interstitial spacings, which enhance color purity by reducing the possibility of adjacent color-emitting phosphor elements being excited by a specific electron beam.

With the advancement of the color television art, there has been a continued desire to improve the contrast ratio of the color screen display, whereof several approaches have been proposed. One approach relates to filling the interstitial spacing between the phosphor elements with an opaque light-absorbing material. Primarily, the inclusion of this fill-in material enhances contrast by preventing ambient light from being reflected by the unexcited areas of the screen and the aluminum backing on the screen in the interstitial areas not covered by the phosphor elements. Thus, by incorporating such material, each phosphor element is defined by a substantially non-translucent encompassment which collectively comprise a multi-opening pattern in the form of a windowed webbing having a lace-like array of opaque interconnecting interstices. Such web-like screen structures have been fabricated, either before or after phosphor screening, by several known processes wherein photodeposition techniques constitute a fundamental part. While this black surround feature reduces the reflected ambient light in the non-fluorescing areas of the screen, it does not reduce the ambient light reflected from those panel areas associated with the phosphor dots and the light emission emanating therefrom, which areas evidence a high degree of reflectivity.

Another proposal to improve contrast concerns the absorbing of ambient light by utilization of a neutral density filter member, formed of a tinted cover plate, superposed over the viewing panel of the tube. Since neutral density filters are not appreciably selective in the visible band of the color spectrum, intended absorptive efficiency cannot be fully realized in eliminating the reflected ambient light falling within the spectrum bandpass of the display emission. Another approach to improve the contrast ratio of a color image display is the utilization of a tinted faceplate or viewing panel per se. Tinting or coloring of the glass comprising the faceplate attenuates the light transmission of that member, thereby reducing the evidenced brightness of the phosphor emissions emanating from the electron excited screen. In addition, there are absorptive shortcomings similar to those of the aforementioned neutral density filter.

An additional proposal for enhancing contrast of the color screen display has been the use of optical filter elements disposed relative to the respective color-emitting phosphors comprising the screen pattern. Both single and plural layered optical filters have been proposed, each utilizing circular filter elements having large oversized diameters, dimensioned so that their outer peripheral portions overlap in a non-uniform manner to produce an irregularly shaped or indented filter area surrounded by a non-uniform interstitial webbing. These variations in the dot-surround webbing effect a variable absorbency of the ambient light thereby detracting from the complete achievement of the intended contrast enhancement. In addition, the indented peripheral shaping of the filter windows reduces the areal expanse of the evidenced light output of the screen.

OBJECTS AND SUMMARY OF THE INVENTION

It is an object of the invention to reduce the aforementioned disadvantages and to provide a process for fabricating an improved screen structure for a color cathode ray tube evidencing improved display contrast. Another object is to provide a process for fabricating an improved color cathode ray tube screen structure incorporating a basic opaque windowed structure whereupon one or more patterns of optical filter means are disposed.

These and other objects and advantages are achieved in one aspect of the invention by utilizing an opaque multi-windowed webbing disposed on the inner surface of a cathode ray tube viewing panel. The window areas of the webbing define discrete optical filter elements, each being surrounded by a uniform opaque interstitial encompassment that exhibits a peripherally defined smoothness free of indentations, such window shapings being similar to the shape of the apertures in a spatially related pattern mask member. Upon this basic windowed webbing, one or more discrete patterns of optical filter elements are disposed by a multi-step procedure. The interior of the viewing panel, having the opaque windowed webbing disposed thereon, is coated with an aqueous solution of a binder, such as potassium silicate, and then heated to provide improved bonded adherence of the windowed webbing to the panel surface. A uniform coating of a first heat formable optical filter material is applied thereover, whereupon the coated panel is again heated in a controlled oxygen atmosphere to transform and adhere the first optical filter material thereto. Next, a coating of a first acid-resistant negative photosensitive resist material is applied thereover, and exposed by directing actinic radiation from a first exposure source through the apertures of a related pattern mask to light polymerize first pattern areas of the resist coating. The exposed coating is then developed by removing the unexposed resist to provide a primary deposition of first pattern polymerized areas so oriented to protectively cover areas of the first optical filter material disposed in those window areas designated as the first window pattern of the screen webbing. Removal of the extraneous first optical filter material, from the areal expanse not protected by the polymerized primary deposition, provides a defined first pattern of optical filter elements therebeneath. A uniform layer of a protective coating formed of a second negative photosensitive resist material, differing chemically from the aforementioned first photoresist composition is admixed with an inert substance, and applied and exposed to actinic radiation from the first exposure position to light polymerize areas of a first pattern, whereupon development removes the unexposed second photosensitive mixture therefrom to provide a secondary deposition of first pattern polymerized areas superposed on the polymerized primary first pattern deposition. Thence, a coating of a second heat formable optical filter material is applied thereover, and the panel heated in a controlled oxygen atmosphere to transform and adhere the second optical filter material to portions thereof; whereupon, the superposed primary and secondary depositions of polymerized first pattern areas, being thermally degraded and loosely retained in those areas, are removed from covering the first pattern of optical filter elements. The panel is now coated with a second application of the first acid-resistanat negative photosensitive resist material and exposed to actinic radiation from first and second exposure positions to light-polymerize first and second pattern areas of the resist coating. Ensuing development of the exposed panel removes the unexposed acid-resistant photosensitive resist to provide a primary polymerized deposition of first and second pattern polymerized areas which protectively cover defined areas of the first and second optical filter materials disposed in the first and second window patterns of the screen webbing. Removal of the extraneous second optical filter material, from those areas not protected by the primary polymerized deposition of the first and second pattern areas, defines first and second patterns of optical filter elements therebeneath; and upon removal of the overlying primary first and second patterns of protective polymerized areas, there is provided a basic screen structure having discrete first and second pattern optical filter elements associated with the respective first and second pattern windows in the screen webbing. If it is desired to have a third pattern of optical filter elements associated with the third pattern windows of the screen structure webbing, the process is continued by retaining the polymerized primary deposition covering the first and second optical filter elements, and applying thereover a uniform layer of a protective coating formed of the second negative photosensitive resist material admixed with an inert substance. This coating is then exposed to actinic radiation from first and second exposure positions to light polymerize areas of first and second patterns, whereupon development removes the unexposed photosensitive mixture to provide a secondary polymerized deposition of first and second pattern areas superposed on the polymerized primary first and second pattern depositions. A coating of a third heat formable optical filter material is then applied and heated in a controlled oxygen atmosphere to transform and adhere the third optical filter material to portions of the screen structure. The superposed primary and secondary protective depositions of polymerized first and second pattern areas, being thermally degraded and loosely retained thereover, are removed thereby providing defined first, second and third optical filter elements associated with the respective first, second and third pattern windows in the screen webbing. The presence of these diverse filtering means in conjunction with related color-emitting phosphors in the finished screen structure evidence improved selectivity of filtering and effect enhanced absorbency of the ambient light impinging the exterior surface of the viewing panel, thereby producing improved contrast of the color display emanating from the screen of the tube.

DESCRIPTION OF THE PREFERRED EMBODIMENT

For a better understanding of the present invention, together with other and further objects, advantages and capabilities thereof, reference is made to the following specification and appended claims in connection with the aforedescribed drawings.

Figure 1A:
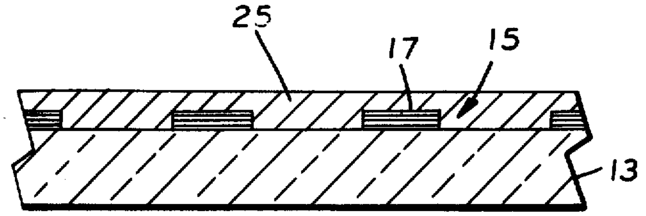
FIGS. 1*a* through 1*c* are cross-sectional views illustrating deposition of the first optical filter elements in the first window pattern of the basic webbing of the screen structure.
Figure 1B:
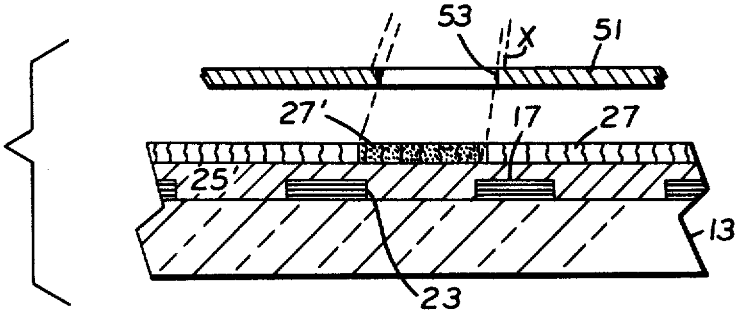
Figure 1C:
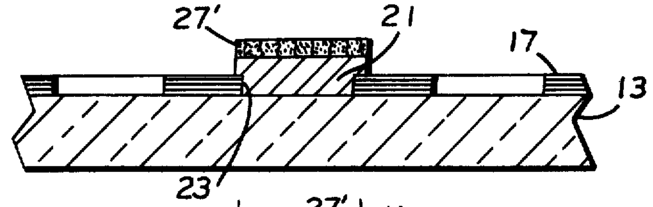
Figure 1D:
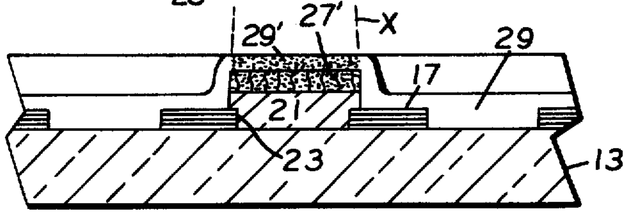
FIGS. 1*d* through 1*h* are cross-sectional views relating to the deposition of the second optical filter elements disposed in the second pattern windows of the screen webbing.
Figure 1E:
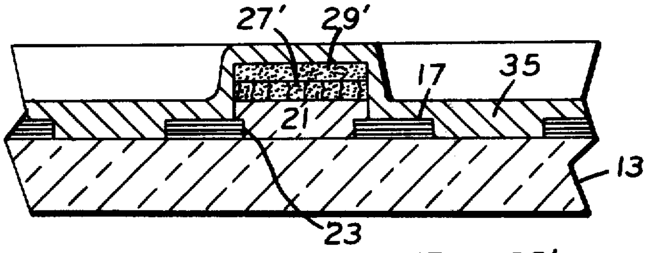
Figure 1F:
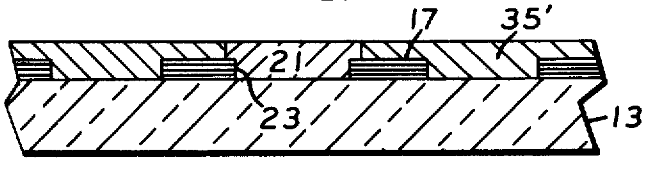
Figure 1G:
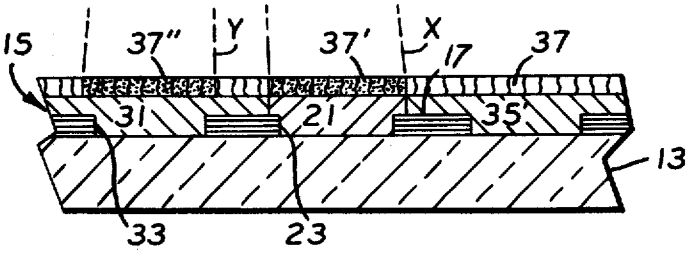
Figure 1H:
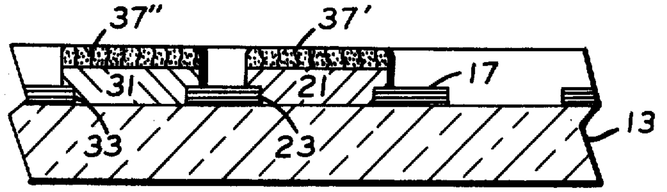
Figure 1I:
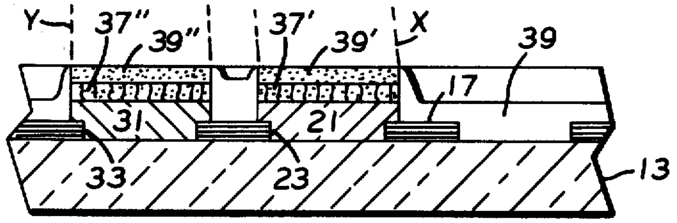
FIGS. 1*i* through 1*k* are cross-sectional views illustrating deposition of the third optical filter elements in the window webbing of the screen structure wherein portions of the third filter materials cover the interstitial portions of the webbing.
Figure 1J:
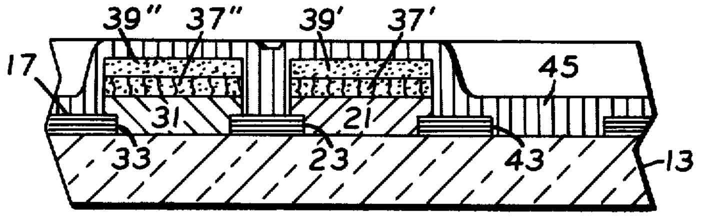
Figure 1K:
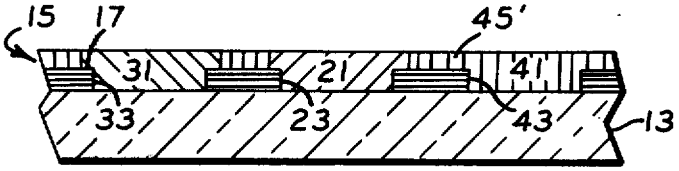
Figure 1L:
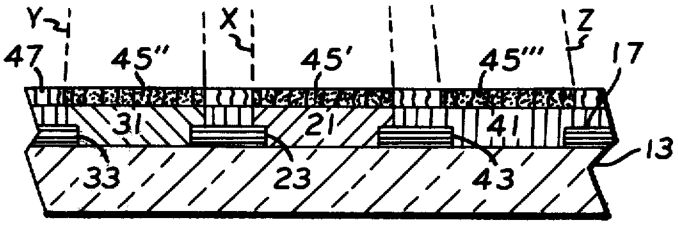
FIGS. 1*l* and 1*m* are cross-sectional views illustrating the procedure for removing the third optical filter material from the interstitial portion of the screen webbing.
Figure 1M:
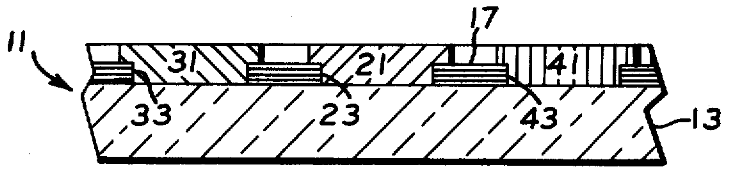
Figure 1N:
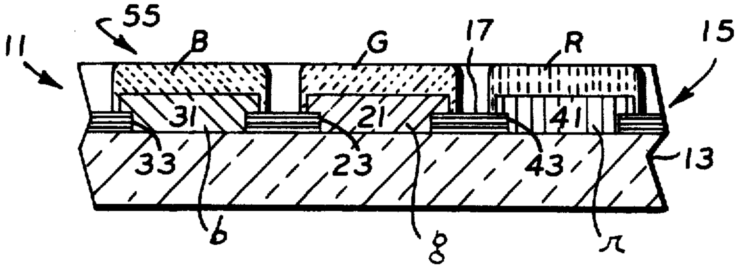
FIG. 1*n* is a sectional view showing the completed screen structure.

The multi-windowed color cathode ray tube screen structure 11 having optical filter elements formed by the process described herein, utilizes a multi-windowed webbing formed of a substantially opaque material disposed contiguous to the interior surface of the viewing panel 13, as shown in FIG. 1*n*. In this instance, the webbing 15 defines substantially round window areas each of which is surrounded by a uniform opaque interstitial encompassment 17. Other window configurations, such as elongated and eliptical shapings, are intended to be in keeping with this disclosure, such configurations being similar to the shape of the apertures in a spatially related pattern mask member. The ensuing screen structure so described may be utilized in either post-deflection or shadow mask types of color cathode ray tube constructions.

The basic windowed webbing 15 is priorly disposed on the interior surface of the glass viewing panel 13 by a known procedure, briefly reviewed as follows. By way of example, a polyvinyl alcohol (pva) solution photosensitized with a suitable chromate material, is applied to the inner surface of the panel by known techniques in the art. An apertured pattern member is then spatially positioned within the panel and the sensitized pva coating exposed by beaming actinic radiation, for predeterminately located sources, through the multiple openings in the mask to photopolymerize discrete portions of the panel coating in the areas subsequently occupied by the phosphor elements of the screen pattern. The exposed coating is then developed to remove the unexposed pva, thereby providing a web pattern of substantially bare glass defining interstitial spacings between the substantially clear polymerized pattern elements. These polymerized dot-like elements, subsequently become the window areas in the opaque interstitial webbing of the subsequently formed color screen structure.

The patterned panel is then overcoated with a uniform layer of a substantially opaque conductive material, for example, a carbon containing substance such as a colloidal suspension graphite, which upon drying, is treated with a degrading agent such as hydrogen peroxide. This treatment effects an effervescent degradation of the polymerized screen pattern element areas and loosens the associated graphite thereon. The resultant degradation materials and loosened graphite coating are thence removed by pressurized water, thereby providing the basic window webbing 15 of the screen structure.

The multi-element windowed screen structure 11 having diverse optical filter elements disposed therein, as illustrated in FIG. 1*n*, is of the type, for example, as that used in a conventional shadow mask type of color cathode ray tube. As is well known, conventional tubes of this kind utilize several electron beams which are directed to converge at a multi-apertured shadow mask, not shown, and thence pass through the apertures therein to impinge selected phosphor areas of the composite screen structure spaced therebeneath. The multi-element screen structure 11 is disposed on the interior surface of the cathode ray tube glass viewing panel; whereof the visible light transmissivity of the panel is relatively high being preferably in the neighborhood of 90 percent, the light attenuation of the glass per se being inherent to the elemental composition thereof. A first optical filter element 21 is disposed in the first window pattern 23 of the opaque webbing 15 and is comprised of a first heat formable optical filter material. Spacedly adjacent thereto is a second optical filter element 31 disposed in the second window pattern 33 of the opaque webbing and is comprised of a second heat formable optical filter material differing in hue from that of the first optical filter. And, also adjacent is a third optical filter element 41 disposed in the third window pattern 43 of the webbing, such being formed of a third heat formable optical filter material. Disposed over these respective filter element areas in the screen structure are exemplary patterned groupings of compatibile green (G), blue (B), and red (R) cathodoluminescent phosphor elements, which upon electron excitation produce color emissions that are colorimetrically related to the respective hue-related filter elements *g*, *b* and *r* there-beneath. The color emissions of the respective phosphor materials are selectively enhanced by transmission through the associated filtering elements.

Portions of the process for fabricating the aforedescribed diverse optical filter elements disposed in the respective window areas of the opaque webbing 15 of the screen structure, are delineated in FIGS. 1*a* through 1*m* of the drawings.

The process for fabricating the optical filter elements is initiated in a viewing panel 13 already containing the basic multi-windowed opaque webbing 15, such webbing being disposed thereon by the aforedescribed procedure. The webbed interior of the panel is first coated with a binder material such as a 5–10 percent solution of potassium silicate in water and dried, whereupon the panel is baked at a temperature of substantially 400° Centigrade for a time period of about one-half hour to form an impregnating potassium silicate binder for holding the graphite webbing in place during subsequent processing. It is important that the basic webbing be securely adhered to the panel. Since the residual binder substantially impregnates the webbing, it is not shown in the drawings. The treated panel is then coated with a uniform layer of a first heat formable optical filter material 25, such as represented by the organometallic luster compounds, which are commonly known as liquid luster preparations, such being illustrated in FIG. 1*a*. Such compositions are base metal organic solutions of metals such as tin, iron, bismuth, titanium and the like, which may contain additions of metallo-organic compounds of precious metals dissolved in organic solvents. The initial color of a liquid luster preparation usually bears no semblance to the desired optical filter hue resultant from subsequent heat transformation. While luster preparations are available commercially, their formulary compositions are usually considered to be proprietary with the manufacturer of the product. A metallic luster material suitable for use as the first optical filter component in the screen structure may be, for example, a green producing luster material, such as A-1128, which is commercially available from Hanovia Liquid Gold Division, Englehard Industries, Incorporated, East Newark, N.J. A proprietary luster thinning composition is added to the luster material to provide a coating thickness evidencing desired optical attenuation and to adjust the viscosity of the liquid luster material to expedite efficient application thereof over the webbed panel surface. It has been found that a coating viscosity in the order of 8 to 10 centipoises is appropriate for spin application of the luster material, when rotating the panel in substantially the range of 90 to 150 rpm, whereupon a uniformly applied coating thickness is achieved.

Upon drying, the overcoated panel is heated or fired in a controlled oxygen atmosphere at a temperature in the range of 450° to 500° Centigrade, for a time period such as from 2 to 3 hours. This environmentally controlled heating transforms and oxidizes the first luster material changing the color thereof to a green-hued optical filter material 25, and further effects adherence of a substantially continuous and transparent glassy layer of the transformed optical filter material 25' to the patterned panel as shown in FIG. 1*b*. The panel is then overcoated with a covering of a first acid-resistant negative photosensitive resist material 27, such as KPR which is commercially available from Eastman Kodak Company, Rochester, N.Y. A negative photosensitive resist composition is a light-activated material that becomes polymerized when exposed to substantially actinic radiation.

The apertured pattern mask 51 is positioned in spaced relationship to the negative resist coated surface of the panel, as shown in FIG. 1*b*, whereupon the photosensitive coating 27 is discretely light exposed by directing actinic radiation emanating from a first exposure source X through the apertures 53 in the pattern mask, one of which is shown, to light polymerize the first pattern areas 27' therein. The photo-polymerized areas 27' of the exposed resist coating are usually slightly larger than the area of the formative aperture 53 in the mask member 51. After exposure, the pattern mask is removed from the proximity of the panel, and the light exposed panel coating then developed with trichlorethylene or KPR developer, which removes the unexposed resist coating to provide a primary deposition of first pattern polymerized areas 27' protectively covering areas of the first optical filter material 21 disposed in the first window pattern 23 of the screen webbing 15.

The extraneous first optical filter material is removed from those areas not protected by the primary deposition 27' of the first pattern polymerized areas by subjecting the screen structure to an etchant such as a 10 percent solution of hydrochloric acid followed by a water rinse. Such treatment provides a defined first pattern of optical filter elements 21 disposed in the first pattern windows of the screen webbing. At this point in screen fabrication, the first pattern optical filter elements are still overlaid with the discrete polymerized areas of the primary deposition 27', as shown in FIG. 1*c*. If it is desired to have a screen structure wherein only one pattern of optical filter elements are disposed, the panel is heated at this stage in construction to volatilize and remove the first pattern of primary polymerized areas 27' to provide a basic screen structure wherein the first pattern optical filter elements 21 are associated only with the first pattern windows 23 of the webbing 15 of the screen structure.

Usually it is desired to have a screen structure wherein more than one pattern of optical filter elements are contained, therefore, the polymerized primary deposition 27' of the first pattern areas is usually retained and overcoated with a uniform layer of a protective coating 29 formed of a second netative photosensitive resist material admixed with an inert substance. The second negative resist, which differs chemically from the first acid-resistant negative resist, is applied to prevent superposed layers of diverse filter materials from becoming intermixed during fabrication of the screen structure. A suitable resist for this type of application is one such as a water-alcohol solution of polyvinyl alcohol sensitized with ammonium dichromate, and having admixed therewith an inert protective substance that is chemically and thermally inactive to the temperatures and materials encountered in the process, and one that does not substantially alter the pH of the polyvinyl alcohol system. A suitable inert material is one such as aluminum silicate, which is also known as Kaolin, zinc oxide, calcium carbonate, and materials related thereto. Preparation of this protective coating material, which is also referred to as a stopoff photoresist, is a two-step formulation procedure. An initial suspension is first prepared wherein, for example, 40 grams of aluminum silicate and 20 grams of polyvinyl alcohol solids are added to 400 cubic centimeters (cc) of deionized water and ball-milled to provide a complete suspension, which is then filtered to remove any residual lumps and air bubbles therefrom. Equal volumes of this basic suspension and a monohydrate alcohol, such as ethanol or methanol, are admixed and the resultant mixture then sensitized with a 3 percent by volume of a 12.5 weight percent of ammonium dichromate solution. This protective photosensitive mixture is applied to the face panel structure as by spraying, flowing, or spinning whereupon the coated panel is dried. With reference to FIG. 1*d*, the second resist coating 29 is then exposed by directing actinic radiation X from the first exposure position through the apertures in the pattern mask to light-polymerize areas 29' of the first pattern. The light exposed panel coating is then developed, such as by water rinsing, which removes the unexposed photosensitive coating mixture from the panel surface to provide a secondary deposition 29' of first pattern polymerized areas superimposed on the already present polymerized primary first pattern deposition 27'. The panel structure is then overcoated with a uniform layer of a heat formable second optical filter material 35, as for example, a second color-producing liquid organo-metallic luster compound, as illustrated in FIG. 1*e*. This second filter material may be, for example, a blue-producing luster composition, such as No. 130-F, which is also available from Englehard Industries. The coated panel is again subjected to heating in a controlled oxygen atmosphere in a temperature range of 450° to 500° Centigrade to thermally decompose or degrade the superposed primary 27' and secondary 29' polymerized protective depositions covering the first pattern optical filter elements 21, the thermally degraded materials being loosely retained thereon. The baking procedure transforms and adheres a substantially continuous and transparent glassy layer of the second optical filter material over the screen structure except in the protected first optical filter element areas 21. The inert protective material contained in the second photosensitive resist mixture 29 prevents the second luster material 35 from contaminating the underlying first optical filter element 21. Transformation and oxidation of the second luster composition changes the color thereof to a blue-hued optical filter material.

The panel is next treated in a manner to remove the loosely retained inert protective and associated filter materials overlying the first optical filter elements 21. One removal procedure is in the form of lightly brushing the panel with a non-abrasive means, such as a soft-hair brush. This may be followed by application of a sweeping of low pressure air, or a water rinse. Another successful removal means is in the form of immersing the screen structure area in an aqueous solution, such as water and a compatible wetting agent, and then submitting the screen environment to a controlled application of ultrasonic vibrations, after which the screen area is rinsed with water to completely remove the residuals, whereupon the panel is dried. This stage of the partially fabricated screen structure is clearly referenced in FIG. 1f, wherein the patterned first optical filter elements 21 and the surrounding second optical filter material 35' are delineated.

With reference to FIG. 1g, the panel is again covered with another coating of the first acid-resistant negative photosensitive resist material 37, and exposed to actinic radiation emanating from first and second exposure positions X and Y, such being directed through the apertures of the pattern mask to light-polymerize first 37' and second pattern 37'' areas of the first resist coating 37. This exposed acid-resistant coating is developed to remove the unexposed portions of the resist, thereby providing a primary deposition of polymerized first 37' and second pattern 37'' areas protectively covering areas of the first 21 and second 31 optical filter materials disposed in the first 23 and second 33 window patterns of the screen webbing 15. The extraneous second optical filter material 35' is removed from those areas not protected by the polymerized primary depositions by the aforementioned acid-etchant procedure to provide first 21 and second patterns 31 of optical filter elements covered by defined polymerized areas 37' and 37'' of the primary deposition; such being shown in FIG. 1h. If it is desired to have only first and second optical filter elements 21 and 31 disposed in the windowed screen structure, the polymerized first and second positive patterns 37' and 37'' of the primary deposition are removed leaving the discretely disposed first and second filter elements.

In referring to FIG. 1i, when three optical filter elements are required in the screen structure 11, the polymerized primary depositions 37' and 37'' are usually retained over the first 21 and second 31 optical filter elements, and a uniform layer of the protective coating 39 formed of the second negative photosensitive resist material, which has an inert substance admixed therewith, is applied thereover. The coated panel structure is then exposed with actinic radiation from the first X and second Y exposure positions through the apertures of the pattern mask to light-polymerize areas of the first 39' and second 39'' patterns in the protective coating 39. Upon development, the unexposed protective photosensitive mixture is removed to provide a secondary polymerized deposition of first 39' and second 39'' pattern areas superposed on the polymerized primary first 37' and second 37'' pattern deposition. The panel is then covered with a uniform coating of a heat formable third optical filter material 45, such as another or third organometallic luster compound, such being illustrated in FIG. 1j. A suitable luster preparation for the third optical filter element may, for example, be a red-producing luster, such as Red Rose No. 9736 or Ruby Red No. 9761, such compositions being commercially available from Englehard Industries.

The overcoated panel is again subjected to a repeat or third heating in a controlled oxygen atmosphere wherein the superposed polymerized protective layers 37', 39', and 37'', 39'' are thermally degraded and the third luster material transformed, oxidized and adhered as is substantially continuous and transparent layer 45' of the third red-hued optical filter material, the thermally degraded materials being loosely retained on those areas occupied by the underlying first 21 and second 31 optical filter elements. The panel is then treated to remove the loosely retained degraded polymerized and overlaid red luster materials to provide defined first 21, second 31, and third 41 optical filter elements associated with the respective first 23, second 33, and third 43 pattern windows in the webbing of the screen structure 15. With reference to FIG. 1k, it will be noted that the third optical filter material 45' overlays portions of the opaque interstitial webbing 17. Such is not detrimental to the functioning of the windowed screen structure since the third filter material disposed back of the webbing is masked from the viewer.

Should it be desired to remove the third optical filter material disposed on the back or screen-side portions of the interstitial webbing 17, the fabrication procedure is continued by coating the panel, having a three filter element disposed thereon, with another or third application of the first acid-resistant negative photosensitive resist material 47. The panel is then exposed by directing actinic radiation from the first X, second Y and third Z exposure sources through the mask to light-polymerize the respective areas 45', 45'', 45''' for the three filter area patterns as illustrated in FIG. 1l. Development removes the unexposed acid-resistant photosensitive resist to provide a polymerized deposition of first 45', second 45'' and third 45''' pattern areas protectively covering the areas of the first 21, second 31 and third 41 optical filter materials therebeneath. The patterned panel is then subjected to the hydrochloric acid bath to remove the third optical filter material from the interstitial areas 17 not protected by the polymerized pattern areas, whereupon there are provided distinctly separated first 21, second 31 and third 41 optical filter pattern elements disposed on respective window areas of the screen structure 11, such as is illustrated in FIG. 1m.

With reference to FIG. 1n, upon completing the deposition of the optical filter elements in the respective window areas of the screen structure webbing 15, respective color-emitting green G, red R and blue B cathodoluminescent phosphor elements are suitably disposed as a patterned screen 55 over the appropriate *g*, *r*, and b filter elements. Since deposition of the pattern of color-emitting phosphor elements is accomplished in a conventional manner by one of the procedures well known in the art, further details of the phosphor screening process will not be considered herein.

Thus, there is provided a process for fabricating an improved color cathode ray tube screen structure incorporating a basic opaque windowed webbing whereupon one or more patterns of optical filters are discretely disposed. The respective optical filter elements improve the color purity of the screen imagery by providing improved selective filtering of the light comprising the display imagery. The filter elements in conjunction with the opaque interstitial encompassment of the windowed areas, effect enhanced absorbency of the ambient light impinging the exterior surface of the viewing panel thereby producing improved contrast of the color display emanating from the screen.

While there have been shown and described what are at present considered the preferred embodiments of the invention, it will be obvious to those skilled in the art that various changes and modifications may be made therein without departing from the scope of the invention as defined by the appended claims.

What is claimed is:

1. In the viewing panel of a color cathode ray tube having diverse phosphors disposed as a plural patterned cathodoluminescent screen upon a multi-windowed webbing of a substantially opaque material formed contiguous with the inner surface of said panel in accordance with a spatially related multiple-apertured pattern mask, a process for fabricating optical filter elements in the windows of said webbing associated with the respective pattern of said screen prior to the deposition of the phosphor materials thereon, said process comprising the steps of:

a. coating said panel with a first heat formable optical filter material;
b. heating said coated panel in a controlled oxygen atmosphere to transform and adhere said first optical filter material thereto;
c. coating said panel with a covering of a first acid-resistant negative photosensitive resist material;
d. exposing said coated panel by directing actinic radiation emanating from a first exposure source through the apertures in said pattern mask to light-polymerize first pattern areas thereon;
e. developing said light-exposed coating by removing the unexposed acid-resistant photosensitive resist to provide a primary deposition of polymerized first pattern areas protectively covering areas of said first optical filter material disposed in the first window pattern of said screen webbing;
f. removing the extraneous first optical filter material from those areas not protected by said primary deposition of polymerized said first pattern areas to provide a defined first pattern of optical filter elements therebeneath;
g. coating said panel with a uniform layer of a protective coating formed of a second negative photosensitive resist material admixed with an inert substance;
h. exposing said panel with actinic radiation from said first exposure position through the apertures in said pattern mask to light-polymerize areas of a first pattern in said coating;
i. developing said light-exposed coating by removing the unexposed second photosensitive mixture therefrom to provide a secondary deposition of first pattern polymerized areas superposed on said polymerized primary first pattern deposition;
j. coating said panel with a second heat formable optical filter material;
k. heating said panel in a controlled oxygen atmosphere to transform and adhere said second optical filter material to portions thereof, said superposed primary and secondary depositions of polymerized first pattern areas being thermally degraded and loosely retained by said heating;
l. treating said panel to remove said loosely retained degraded polymerized materials covering said first pattern of optical filter elements;
m. coating said panel with a covering of said first acid-resistant negative photosensitive resist material;
n. exposing said coated panel to actinic radiation from first and second exposure positions through the apertures of said pattern mask to light-polymerize first and second pattern areas thereon;
o. developing said exposed panel by removing the unexposed acid-resistant photosensitive resist to provide a primary deposition of polymerized said first and second pattern areas protectively covering specific areas of said first and second optical filter materials disposed in the first and second window patterns of said screen webbing;
p. removing the extraneous second optical filter material from those areas not protected by said primary deposition of polymerized first and second pattern areas to provide first and second patterns of optical filter elements therebeneath; and
q. removing said primary first and second patterns of polymerized areas to provide a basic screen structure having discrete first and second pattern optical filter elements associated with the first and second pattern windows in the webbing of said screen structure.

2. The process for fabricating optical filter elements in the windows of the screen structure webbing according to claim 1 wherein the third optical filter element associated with the third pattern windows of said webbing are disposed by eliminating the step (q) of claim 1 and adding the steps of:

r. coating said panel having the first and second patterns of optical filter elements thereon with a uniform layer of a protective coating formed of said second negative photosensitive resist material admixed with an inert substance;
s. exposing said panel with actinic radiations from said first and second exposure positions through the apertures of said pattern mask to light-polymerize areas of said first and second patterns in said coating;
t. developing said light-exposed coating by removing the unexposed photosensitive mixture therefrom to provide a secondary deposition of polymerized first and second pattern areas superposed on said primary polymerized first and second pattern depositions;
u. coating said panel with a third heat formable optical filter material;
v. heating said panel in a controlled oxygen atmosphere to transform and adhere the third optical filter material to portions thereof, said superposed primary and secondary depositions of polymerized first and second pattern areas being thermally degraded and loosely retained by said heating; and
w. treating said panel to remove said loosely retained degraded polymerized materials covering said first and second patterns of said optical filter elements to provide defined first, second and third optical filter elements associated with the respective first, second and third pattern windows in the webbing of said screen structure.

3. In the viewing panel of a color cathode ray tube having diverse phosphors disposed as a plural patterned cathodoluminescent screen upon a multi-windowed webbing of a substantially opaque material formed contiguous to the inner surface of said panel in accordance with a spatially related multiple-apertures pattern mask, a process for disposing a pattern of first optical filter elements in the window areas of said webbing associated with the first pattern of said screen prior to the deposition of the phosphor materials thereon, said process comprising the steps of:

a. coating said panel with a first heat formable optical filter material;
b. heating said coated panel in a controlled oxygen atmosphere to transform and adhere said first optical filter material thereto;

c. coating said panel with a covering of a first acid-resistant negative photosensitive resist material;

d. exposing said coated panel by directing actinic radiation emanating from a first exposure source through the apertures in said pattern mask to light-polymerize first pattern areas thereon;

e. developing said light-exposed coating by removing the unexposed acid-resistant photosensitive resist to provide a primary deposition of polymerized first pattern areas protectively covering areas of said first optical filter material disposed in the first window pattern of said screen webbing;

f. removing the extraneous first optical filter material from those areas not protected by said primary deposition of polymerized said first pattern areas to provide a defined first pattern of optical filter elements therebeneath;

x. heating said panel to volatilize said first pattern of polymerized primary areas to provide a basic screen structure having discrete first pattern optical filter elements associated with the first pattern windows in the webbing of said screen structure.

4. The process for fabricating optical filter elements in the windows of the screen structure webbing according to claim 1 wherein said heat formable optical filter materials are organo-metallic luster compositions.

5. The process for fabricating optical filter elements in the windows of the screen structure webbing according to claim 1 wherein the removal of extraneous first and second optical filter materials as noted in steps (f) and (p) is accomplished by subjecting said screen structure to an etching bath of 10 percent hydrochloric acid followed by a water rinse.

6. The process for fabricating optical filter elements in the windows of the screen structure webbing according to claim 2 wherein the third optical filter material is substantially removed from the interstitial portions of the screen structure webbing, such being accomplished by the steps of:

coating said panel having the three filter elements disposed thereon wlth a covering of said first acid-resistant negative photosensitive resist material;

exposing said coated panel by directing actinic radiation from said first, second and third exposure sources through the apertures in said pattern mask to light-polymerize areas of the three patterns thereon;

developing said light-exposed coating by removing the unexposed acid-resistant photosensitive resist to provide a primary deposition of polymerized first, second and third pattern areas protectively covering the areas of said first, second and third optical filter materials therebeneath; and removing said third optical filter material from the interstitial areas not protected by said polymerized pattern areas to provide distinctly separated first, second and third pattern optical filter elements.

7. The process for fabricating optical filter elements in the window areas of the screen structure webbing according to claim 1 wherein, prior to coating said web-containing panel with the first heat formable optical filter material, the panel is initially coated with a binder solution to insure adherence of the windowed webbing thereto during screen fabrication.

8. The process for fabricating optical filter elements in the window areas of the screen structure webbing according to claim 7 wherein said binder is an aqueous solution of potassium silicate applied as a coating over the webbing, whereupon the coated panel is heated to provide the desired adherence characteristics.

* * * * *